(12) United States Patent
Gurreri et al.

(10) Patent No.: US 8,359,169 B2
(45) Date of Patent: Jan. 22, 2013

(54) METHOD AND APPARATUS FOR PREDICTING PHYSICAL CONTACT

(75) Inventors: Michael Lawrence Gurreri, York, PA (US); James David Kevern, Steelton, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 666 days.

(21) Appl. No.: 12/429,562

(22) Filed: Apr. 24, 2009

(65) Prior Publication Data

US 2009/0271126 A1 Oct. 29, 2009

Related U.S. Application Data

(60) Provisional application No. 61/047,626, filed on Apr. 24, 2008.

(51) Int. Cl.
*G01B 3/00* (2006.01)

(52) U.S. Cl. .......................................... 702/33; 356/73.1

(58) Field of Classification Search ................ 702/33, 702/35, 40–43, 127, 155, 158, 159, 166, 702/170–172; 395/59, 60, 78, 147
See application file for complete search history.

(56) References Cited

U.S. PATENT DOCUMENTS

| 6,215,555 | B1 * | 4/2001 | Chivers ........................ 356/512 |
| 6,786,650 | B2 | 9/2004 | Dean, Jr. et al. |
| 6,899,466 | B2 | 5/2005 | Manning et al. |
| 6,957,920 | B2 | 10/2005 | Luther et al. |
| 2009/0097800 | A1 * | 4/2009 | Gurreri et al. .................. 385/71 |

\* cited by examiner

*Primary Examiner* — Manuel L Barbee

(57) ABSTRACT

A method of qualifying a ferrule assembly as being adequate to make physical contact upon application of a certain mating force, said ferrule assembly comprising a ferrule having an mating face and two or more fibers in said ferrule extending from said mating face, said method comprising (a) determining a coplanarity line of the ends of said fibers of said ferrule assembly, (b) determining minus coplanarity, said minus coplanarity being the greatest parallel offset between said coplanarity line and a fiber end below the coplanarity line; and (c) determining whether said ferrule assembly will make physical contact as a function of at least said minus coplanarity and said certain mating force.

14 Claims, 4 Drawing Sheets

Current Interface Parameters

| Parameter | Description | 61755-3-4 | 61300-3-30 |
|---|---|---|---|
| X-Angle | Angle with respect to pin holes in long axis of ferrule based on the best fit plane through the ferrule surface. | GX | ✓ |
| Y-Angle | Angle with respect to pin holes in short axis of ferrule based on the best fit plane through the ferrule surface. | GY | ✓ |
| Fiber Height | Individual heights of each fiber relative to least squared plane through fitted ferrule end face. | H | ✓ |
| Maximum Fiber Height Differential | Maximum height difference among all fibers. | HA | ✓ |
| Adjacent Fiber Height Differential | Maximum height difference among adjacent fibers. | HB | ✓ |
| Coplanarity | Relative to a best fit line through the fiber heights, sum of the maximum fiber height above the line and the absolute value of the minimum fiber height below the line. | | |
| X-Radius | Radius of curvature along long axis of ferrule. | RX | |
| Y-Radius | Radius of curvature along short axis of ferrule. | RY | |
| Flatness Deviation | Distance from apex of fitted bi-parabolic curve to a plane that intersects the projected region of interest. | | ✓ |

Note: Measurements are taken after removing the highest 3 percent of the pixels followed by selecting the top 20 percent of the pixels from the ferrule ROI.

FIG. 1

Comparison of Distribution Parameters

| Fiber Height Distribution | Normal Force (N) | Total Coplanarity (μm) | Minus Coplanarity (μm) | Max Height Difference (μm) | Adjacent Height Difference (μm) | RMS Height Deviation (μm) |
|---|---|---|---|---|---|---|
| | 1.7 | 0.500 | 0.042 | 0.500 | 0.500 | 0.479 |
| | 3.7 | 0.500 | 0.217 | 0.500 | 0.200 | 0.580 |
| | 4.7 | 0.500 | 0.250 | 0.500 | 0.100 | 0.592 |
| | 6.0 | 0.500 | 0.250 | 0.500 | 0.500 | 0.866 |
| | 8.9 | 0.500 | 0.417 | 0.500 | 0.500 | 0.645 |
| | 12.3 | 0.500 | 0.458 | 0.500 | 0.500 | 0.479 |

Note: Coplanarity line was constrained horizontally for purpose of analysis.

FIG. 3

METHOD AND APPARATUS FOR PREDICTING PHYSICAL CONTACT

REFERENCE TO RELATED APPLICATION

This application is based on and claims priority to U.S. Provisional Application No. 61/047,626, filed Apr. 24, 2008, incorporated herein by reference.

FIELD OF INVENTION

This invention relates generally to an approach for inspecting and qualifying optical connectors, and, more specifically, to an approach for determining whether ferrules of optical connectors will make physical contact at a certain mating force.

BACKGROUND OF INVENTION

Optical fiber connectors are an essential part of substantially any optical fiber communication system. For instance, such connectors are used to join segments of fiber together, to connect fiber to active devices such as radiation sources, detectors and repeaters, and to connect fiber to passive devices, such as switches, multiplexers, and attenuators.

A typical optical fiber connector comprises housing and a ferrule assembly within the housing. The ferrule assembly comprises a ferrule, which has one or more bore holes to accommodate fibers, and a fiber secured in each bore hole such that the end of the fiber is presented for optical coupling by the ferrule. Of particular interest herein, are multi-fiber ferrules such as the MT ferrules, which are well know.

The housing is designed to engage a "mating structure" having an optical path to which the fiber optically couples during mating. The mating structure may be another connector or an active or passive device as mentioned above. The optical path may be, for example, a fiber in a ferrule, a waveguide in a substrate, a lens, or an optically-transparent mass. The principal function of an optical fiber connector is to hold the fiber end such that the fiber's core is axially aligned with optical pathway of the mating structure. This way, light from the fiber is optically coupled to the optical pathway.

It is well known that to effect an optical coupling and minimize Fresnel loss, there must be sufficient "physical contact" between the fiber and the optical path of the mating structure. Generally, adequate physical contact requires that an area of the fiber core contacts the optical path. In common optical applications, this area is at least 62.5 μm, although it should be understood that the area of physical contact will be a function of a system's tolerance to Fresnel loss. For purposes of illustration, however, throughout this disclosure, we will assume a requisite physical contact of 62.5 μm.

There are many factors that affect a connector's ability to make adequate physical contact when mated. Applicants have identified the following factors as being of particular significance: (1) the compressive force of the mated connectors, (2) the ferrule material, (3) the environmental response, (4) the geometry of the end-face of the ferrule, (5) the variations in the protrusion of the fibers from the end-face of the ferrule, (6) the number of fibers in the ferrule. These features are herein referred to as the "PC connector interface parameters" or "PC parameters" for short. Such parameters are considered in US Published Application No. 2009/0097800 hereby incorporated by reference.

With respect to compressive force parameters, different connectors have different mated forces. The term "mated force" refers to the force applied to the ferrule end face when the connector is mated. This force is typically imparted on the ferrule by virtue of a spring that urges the ferrule away from the connector such that the ferrule end face urges against the mating structure. Typical mating forces for MT-type connectors range from about 2-12 Newtons.

With respect to ferrule material, the parameters of interest are Young's modulus and Poisson's ratio.

Environmental response is yet another PC parameter that may affect physical contact. Although many such environmental conditions exist, of particular interest herein is the coefficient of thermal expansion mismatch between the fiber and the ferrule material. Additionally, there is potentially a permanent fiber withdrawal due to the creep of the adhesive used to fasten the fiber to the ferrule.

Referring to FIG. 1, a table showing current interface parameters is shown. With respect to ferrule geometry, the parameters include x-angle, y-angle, x-radius, y-radius, and flatness deviation. These tend to be difficult parameters to determine and often require a significant degree of compromise and "best fit" techniques.

With respect to variations in fiber protrusion, the current interface parameters include fiber height, maximum fiber height differential, and adjacent height differential. Coplanarity is also being considered as a parameter.

Although these parameters have been used to provide an indication of the likelihood of physical contact, they can be onerous to obtain, subject to error, and ultimately unreliable in certain situations. Therefore, a need exists for an approach that determines whether a connector will make adequate physical contact that is simpler and more reliable. The present invention fulfills this need among others.

SUMMARY OF INVENTION

The present invention provides an approach for determining whether a connector will make adequate physical contact as a function of relative fiber end protrusion, which is easily and consistently obtained, and which provides a reliable determination. Specifically, applicants have determined that parameters based on the ferrule end-face are difficult to obtain and are often subject to compromise and data interpretation. Accordingly, such parameters tend to be somewhat unreliable. Rather than using parameters that are based on the ferrules end face and geometry, applicants use "minus coplanarity" in the qualification process. As used herein, "minus coplanarity" is the greatest distance below a coplanarity line to the end face of a fiber. The "coplanarity line" is determined as the best fit line among the fiber ends. Applicants have found that minus coplanarity provides a reliable indication of whether a multi-fiber ferrule will achieve physical contact for a certain mating force. Other factors affecting physical contact using this approach include the number of fibers in the ferrule and the compliance of the ferrule material. In addition to this approach being reliable, the above mentioned parameters are also independent of the ferrule's geometry. Therefore, they are relatively easy to obtain.

One aspect of the invention is a method of qualifying a ferrule assembly as being adequate to make physical contact upon mating based on minus coplanarity. In a preferred embodiment, the method comprises: (a) determining a coplanarity line of the ends of said fibers of said ferrule assembly; (b) determining minus coplanarity, said minus coplanarity being the greatest distance between said coplariarity line and a fiber end below the coplanarity line; and (c) determining whether said ferrule assembly with make physical contact as a function of at least said minus coplanarity and said certain mating force. The function may also include other parameters, including x-angle of the coplanarity line (with respect to a line normal to the axis established by the MT guide pin holes), slope of the ferrule surface relative to the fibers, protrusion of the fibers, radii of the fiber tips, curvature of the ferrule surface, and the number of fibers.

Another aspect of the invention is an apparatus for determining whether a ferrule assembly is suitable for making physical contact when mated based on minus coplanarity. In a preferred embodiment, the apparatus is configured to perform the following functions: (a) determine a coplanarity line of the ends of said fibers of said ferrule assembly; (b) determine minus coplanarity, said minus coplanarity being the greatest distance between said coplanarity line and a fiber end below the coplanarity line; and (c) determine whether said ferrule assembly with make physical contact as a function of at least said minus coplanarity and said certain mating force. The function may also include other parameters, including x-angle of the coplanarity line (with respect to a line normal to the axis established by the MT guide pin holes), slope of the ferrule surface relative to the fibers, protrusion of the fibers, radii of the fiber tips, curvature of the ferrule surface, and the number of fibers.

BRIEF DESCRIPTION OF THE DRAWINGS

FIG. 1 shows a table of current interface parameters.

FIG. 3 shows a comparison of different parameters and their correlation to predicting physical contact.

DETAILED DESCRIPTION

The present invention provides a method of qualifying a ferrule assembly as being adequate to make physical contact upon application of a certain mating force. The ferrule assembly comprises a ferrule having an end-face and two or more fibers extending from the end face of the ferrule. The method comprises: (a) determining a coplanarity line of the ends of said fibers of said ferrule assembly; (b) determining minus coplanarity, said minus coplanarity being the greatest distance between said coplanarity line and a fiber end below the coplanarity line; and (c) determining whether said ferrule assembly with make physical contact as a function of said minus coplanarity and said certain mating force. These steps are considered in greater detail with respect to FIGS. 2 and 3.

Figure 2:
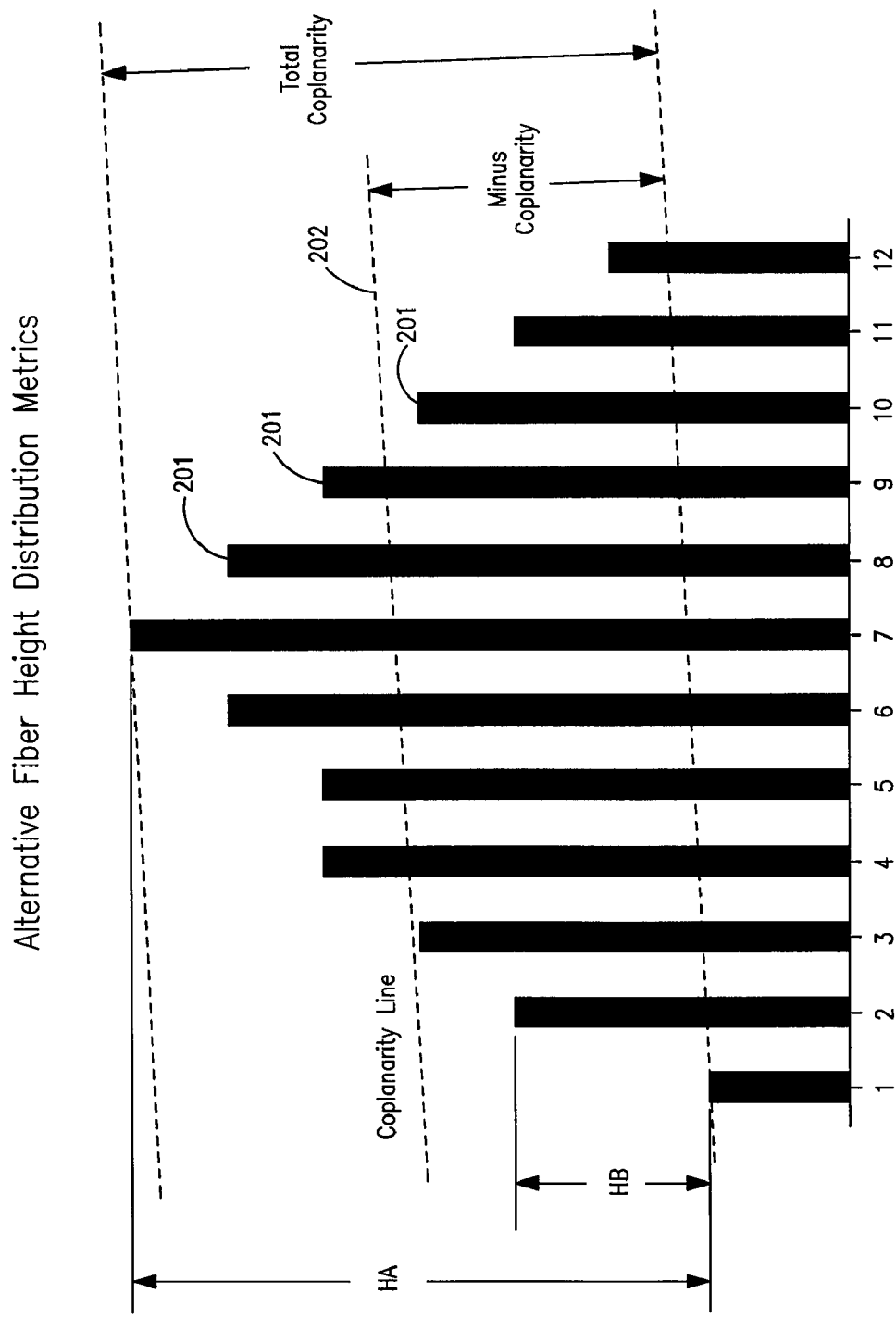
FIG. 2 show a schematic of how minus coplanarity is determined.

Referring to FIG. 2, a schematic is shown indicating how the coplanarity line is determined. The fibers are numbered 1-12 along the horizontal axis. It should be apparent that the fiber ends 201 are at varying heights, which correlate to their protrusion from the ferrule end-face. The coplanarity line 202 is a best fit line among the varying fiber end face heights. This best fit can be determined using known techniques such as the least square technique. To this end, one fiber end can be used as the standard and all the remaining fiber ends can be measured relative to that standard. Noteworthy is the fact that determining the coplanarity line is independent of the ferrule end face. This is important because the ferrule end face can be difficult to measure given its typical parabolic shape.

Once the coplanarity line is determined, the minus coplanarity can be determined. This is a relatively straight forward task as requires determining the greatest parallel offset between the coplanarity line among the fiber ends below the line. Specifically, referring to FIG. 2, fibers 1, 2, 3, 10, 11, and 12 are below the coplanarity line. Of these, fiber end of fiber 1 is the greatest distance from the coplanarity line 202. Therefore, the minus coplanarity is the distance from fiber end of fiber 1 to the coplanarity line 202.

The minus coplanarity provides a reliable measure to determine whether physical contact will be made for a certain mating force. Specifically, for a given mating force, a maximum minus coplanarity can be determined. Anything over this maximum will likely result in physical contact not being achieved. Specifically, referring to FIG. 3, a table showing examples of different fiber profiles and different parameters. The normal force was the force need to achieve physical contact. Noteworthy is the fact that out of all of the parameters indicated including total coplanarity, max. height difference, adjacent height difference, and RMS (root mean square) height deviation, minus coplanarity demonstrated the closest correlation to the mating force required. That is, higher minus coplanarity correlated to higher mating force. Therefore, minus coplanarity is not only determined independently of ferrule end face geometry, but also provides the most reliable indicator of required mating force of the parameters shown.

Although minus coplanarity provides a reliable correlation to physical contact, other geometric parameters also influence physical contact, including, for example, x-angle of the coplanarity line (with respect to a line normal to the axis established by the MT guide pin holes), slope of the ferrule surface relative to the fibers, protrusion of the fibers, radii of the fiber tips, curvature of the ferrule surface, and the number of fibers. (Again, some of these parameters are discussed in US Published Application No. 2009/0097800 hereby incorporated by reference.)

Limiting the variables to three allows response surface methods to be used to vary these parameters systematically, with the applied force needed to achieve PC being the response variable. For example, of these parameters, applicant identifies minus coplanarity, x angle, and fiber tip radius as being significant. Therefore, response surface models considering these parameters may be used with the applied force needed to achieve PC being the response variable. Other variables to be considered include, for example, fiber height, y-angle, ferrule surface geometry, and number of fibers on the ferrule. The model is also extendable to multiple fiber rows and multimode.

Figure 4:
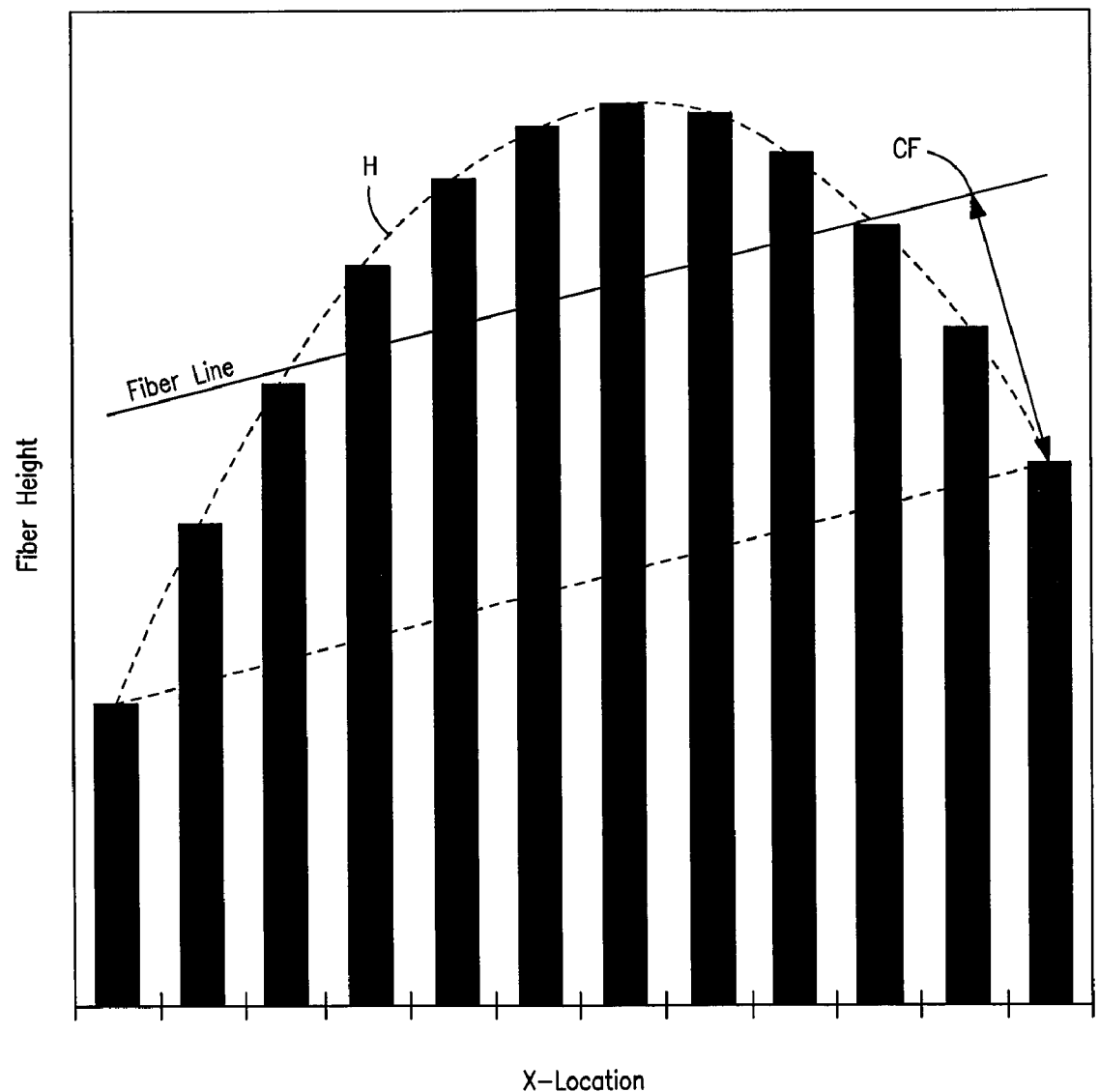
FIG. 4 shows physical contact parameters associated with fibers protruding from a multifiber ferrule.

In manufacturing practice, the applicant found that the fiber height variation of polished end-faces often follow an approximately quadratic function in which the outer fiber protrusions of an array are shorter than the center fibers. Specifically, referring to FIG. 4, the variation in fiber heights tends to follow the following function:

$$H(Xi) = \frac{-6 \cdot CF Xi^2}{p^2 \cdot (n-2) \cdot (n-1)} + GX \cdot Xi + k$$

Where:
  H: Fiber height
  CF: Minus coplanarity
  Xi: X-location of $i^{th}$ fiber
  p: pitch or fiber spacing (e.g. 250 μm)
  n: Total number of fibers
  GX: Fiber line slope angle
  k: Constant height from origin This equation may be used in a simulation to set limits on minus coplanarity and the other PC parameters.

The method of the present invention can be used in testing and qualification apparatus. Specifically, the apparatus may be configured or programmed to determine if minus coplanarity exceeds the maximum allowable value. This apparatus may be a specially-configured ferrule inspection device such as a non-contact interferometer, or a stand-alone computer, which may or may not be interfaced with a ferrule inspection device to receive certain PC parameters therefrom, e.g., differences in fiber end height. Such testing equipment and calculating equipment are well known in the art and their configuration to perform the method of the present invention would be well within the purview of someone skilled in the art in light of this disclosure.

What is claimed is:

1. A computer for determining whether a ferrule assembly is qualified for making physical contact when mated at a certain mating force, said ferrule assembly comprising a ferrule having an mating face and two or more fibers in said ferrule extending from said mating face, said computer being configured to perform the following steps:
    determining a coplanarity line of the ends of said fibers of said ferrule assembly;
    determining minus coplanarity, said minus coplanarity being the greatest parallel offset between said coplanarity line and a fiber end below the coplanarity line; and
    determining whether said ferrule assembly will make physical contact as a function of at least said minus coplanarity and said certain mating force.

2. The computer of claim 1, further comprising a non-contact interferometer configured to measure the relative position of the ends of said fibers and to provide this data to said computer.

3. The computer of claim 1, wherein said function also includes one or more of the following parameters: x-angle of the coplanarity line, slope of the ferrule surface relative to the fibers, protrusion of the fibers, radii of the fiber tips, curvature of the ferrule surface, and the number of fibers.

4. A method of qualifying a ferrule assembly as being adequate to make physical contact upon application of a certain mating force, said ferrule assembly comprising a ferrule having an mating face and two or more fibers in said ferrule having fiber ends extending from said mating face, said method comprising:
    (a) using an interferometer to measure the relative position of the ends of said fibers;
    (b) determining a coplanarity line of the ends of said fibers of said ferrule assembly;
    (c) determining minus coplanarity, said minus coplanarity being the greatest parallel offset between said coplanarity line and a fiber end below the coplanarity line;
    (d) determining whether said ferrule assembly will make physical contact as a function of at least said minus coplanarity and said certain mating force;
    (e) accepting said particular ferrule assembly if physical contact will be made as determined in step (d), or rejecting said particular ferrule if physical contact will not be made as determined in step (d), wherein steps (b)-(d) are performed in said interferometer.

5. The method of claim 4, wherein said function also includes one or more of the following parameters: x-angle of the coplanarity line, slope of the ferrule surface relative to the fibers, protrusion of the fibers, radii of the fiber tips, curvature of the ferrule surface, and the number of fibers.

6. The method of claim 5, wherein said function also includes at least said x-angle of the coplanarity line and said radii of the fiber tips.

7. The method of claim 4, wherein determining whether said ferrule assembly will make physical contact comprises determining if said minus coplanarity is above a certain magnitude.

8. The method of claim 4, wherein said coplanarity line is determined using least squares of the difference among the fiber end faces.

9. The method of claim 4, wherein said method is performed without reference to the mating face.

10. A method of qualifying a ferrule assembly as being adequate to make physical contact upon application of a certain mating force, said ferrule assembly comprising a ferrule having an mating face and two or more fibers in said ferrule having fiber ends extending from said mating face, said method comprising:
    (a) using an interferometer to measure the relative position of the ends of said fibers;
    (b) determining a coplanarity line of the ends of said fibers of said ferrule assembly;
    (c) determining minus coplanarity, said minus coplanarity being the greatest parallel offset between said coplanarity line and a fiber end below the coplanarity line;
    (d) determining whether said ferrule assembly will make physical contact as a function of at least said minus coplanarity and said certain mating force;
    (e) accepting said particular ferrule assembly if physical contact will be made as determined in step (d), or rejecting said particular ferrule if physical contact will not be made as determined in step (d), wherein steps (b)-(d) are performed in a computer interfaced with said interferometer.

11. The method of claim 10, wherein said computer is communicatively interfaced with said interferometer such that data relating to said relative position of the ends of said fibers is transmitted to said computer.

12. The method of claim 10, wherein said function also includes one or more of the following parameters: x-angle of the coplanarity line, slope of the ferrule surface relative to the fibers, protrusion of the fibers, radii of the fiber tips, curvature of the ferrule surface, and the number of fibers.

13. The method of claim 12, wherein said function also includes at least said x-angle of the coplanarity line and said radii of the fiber tips.

14. The method of claim 10, wherein determining whether said ferrule assembly will make physical contact comprises determining if said minus coplanarity is above a certain magnitude.

* * * * *